United States Patent [19]

Tsunoda et al.

[11] Patent Number: 4,673,853
[45] Date of Patent: Jun. 16, 1987

[54] CONCEALED WIPER SYSTEM

[75] Inventors: Akira Tsunoda; Takahiko Tanaka; Noboru Handa, all of Shizuoka, Japan

[73] Assignee: Asmo Co., Ltd., Kosai City, Japan

[21] Appl. No.: 816,254

[22] Filed: Jan. 6, 1986

[30] Foreign Application Priority Data

Jan. 18, 1985 [JP] Japan .................................. 60-008050
Jan. 20, 1985 [JP] Japan ............................. 60-005550[U]

[51] Int. Cl.⁴ .............................. H02P 3/00; B60S 1/08
[52] U.S. Cl. .................................. 318/443; 318/DIG. 2; 15/250.17
[58] Field of Search ......... 318/443, 444, 445, DIG. 2; 15/250 C, 250.02, 250.04, 250.13, 250.16, 250.17; 307/9, 10 R

[56] References Cited

U.S. PATENT DOCUMENTS 4,431,954  2/1984  Carpenter et al. ............ 15/250.13 X
4,559,484  12/1985  Hirano ...................... 318/DIG. 2 X

FOREIGN PATENT DOCUMENTS 55-102751  8/1980  Japan .................................. 318/443
59-96031   6/1984  Japan .............................. 15/250.17
59-159682  9/1984  Japan ............................. 318/DIG. 2
2024610    1/1980  United Kingdom ............. 15/250.12

Primary Examiner—Charles D. Miller
Assistant Examiner—Bentsu Ro
Attorney, Agent, or Firm—Burns, Doane, Swecker & Mathis

[57] ABSTRACT

A concealed wiper system comprises a wiper motor (1) having a mechanism to house a wiper arm in a retracted stop position by means of the reverse rotation of the wiper motor;

a wiper actuation switch (3) with output capability which consists of a two-bit selection signal output from the selected switch positon;

a wiper motor position detector (2) which detects data on wiper motor output shaft position, said detector output capability consisting of a two bit position signal determined by the position of said output shaft;

a control means (4) consisting of a microcomputer which operates based upon said selection signals and position signals, said microcomputer also outputs both normal and reverse rotation signals; and a wiper motor drive circuit (6) which actuates said wiper motor in both normal and reverse rotation by means of signals from said control means.

6 Claims, 10 Drawing Figures

|  | 2A | 2B |
|---|---|---|
| OFF POSITION | L | L |
| INTERMITTENT POSITION | H | L |
| REVERSE POSITION | L | H |
| MEDIAN POSITION | H | H | ated

CONCEALED WIPER SYSTEM

BACKGROUND OF THE INVENTION

The present invention relates to a concealed wiper system applicable for use with vehicles wherein the wiper has a mechanism to house the wiper blade in the retracted stop position by reversing rotation of the wiper motor. More particularly, it relates to a control device in the concealed wiper system, and new composition of a wiper motor position detector.

DESCRIPTION OF THE PRIOR ART

In the well-known conventional concealed type of windshield wipers, which house the wiper arms within the vehicle body when wipers are not being used, the wiper arm must be stopped at a retracted stop position outside of the normal range of sweep. Thus, to enlarge the wiper arm sweep, a complex mechanical construction is required in which a solenoid-operated cam is used to couple or release an eccentric shaft meshing with the drive shaft. Also, as indicated in the Patent Office Journal (No. 34973 of 1979), a complex circuit is necessitated in which a position feedback cam switch equipped on the wiper motor shaft and a multi-terminal actuation switch for selecting a given wiper actuation connected with a plurality of lead wires the power source, wiper motor, relays and a plurality of control elements. However, since a large current flows directly from the wiper motor to the contacts of the actuation switch and cam switch, large-capacity contacts are required for said switches. The addition of further sophisticated functions and changes in specifications result in limitations.

The applicant for this invention (Pat. applied 1983, No. 86755) has thus proposed a system to house the wiper arm in the retracted stop position by reversing rotation of the wiper motor, in order to simplify the mechanics to enlarge the wiper arm sweep using the wiper motor direction of rotation to change the effective length of the crank arm connected to the wiper arm output shaft. With such a system the mechanical construction is vastly simplified, but the wiper motor must be reversed to the degree possible from a specific position when the wiper arm is at rest in the retracted condition. When one posits an interlock means for every switching operation of the actuation switch and the cam switch, however, the drawback is the complexity of the control circuit employed to combine the contracts of said switches to assure safe retraction of said wiper arm to the housed position.

The forward and reverse actuation of the wiper motor in the wiper housing devices to date have had electrically conductive relay plates on the final reduction gear stage of said motor. Using contacts that slide and make contact on said rotating plates by means of opening and closing in relation to one another, the wiper motor drive circuit has been directly switched by mechanical means in the switching system used for position feedback. Thus, the motor current flows directly to the relay plates, entailing the need for contacts of large amperage. Also, contact wear is considerable, there is a decided loss in spring action, and long-term use is prevented because of durability problems.

As indicated in the Patent Journal (1980, No. 102751), wiper systems have been proposed which work with low current by opening and closing circuits of transistor relays using relay plates and the contacts making contact therewith. However, conventional devices also interrupt current flow with relay plates and contacts; this requires one contact for each interruption of the transistor base current. For the safe reversing of a wiper motor by means of a reliable interlock system, the relay pattern inevitably becomes complex and the relay circuits end up extremely complicated.

OBJECTS AND SUMMARY OF THE INVENTION

Accordingly, it is the main object to provide a concealed wiper system having a simple circuit construction.

It is the another object to provide a concealed wiper system to enable safe housing of the wiper arm in the retracted stop position.

Another important object of the present invention is to provide a concealed wiper system having a wiper motor position detector of simple construction enabling signal readout of multiple position data.

A further object of the invention is to provide a concealed wiper system to which new functions can be readily added.

This invention has as a still further object, the provision of a concealed wiper system of which specifications can be freely changed as desired.

Other and further objects of this invention will become obvious upon an understanding of the illustrative embodiments about to be described or will be indicated in the appended claims, and various advantages not referred to herein will occur to one skilled in the art upon employment of the invention in practice.

DETAILED DESCRIPTION OF PREFERRED EMBODIMENTS

Figure 1:
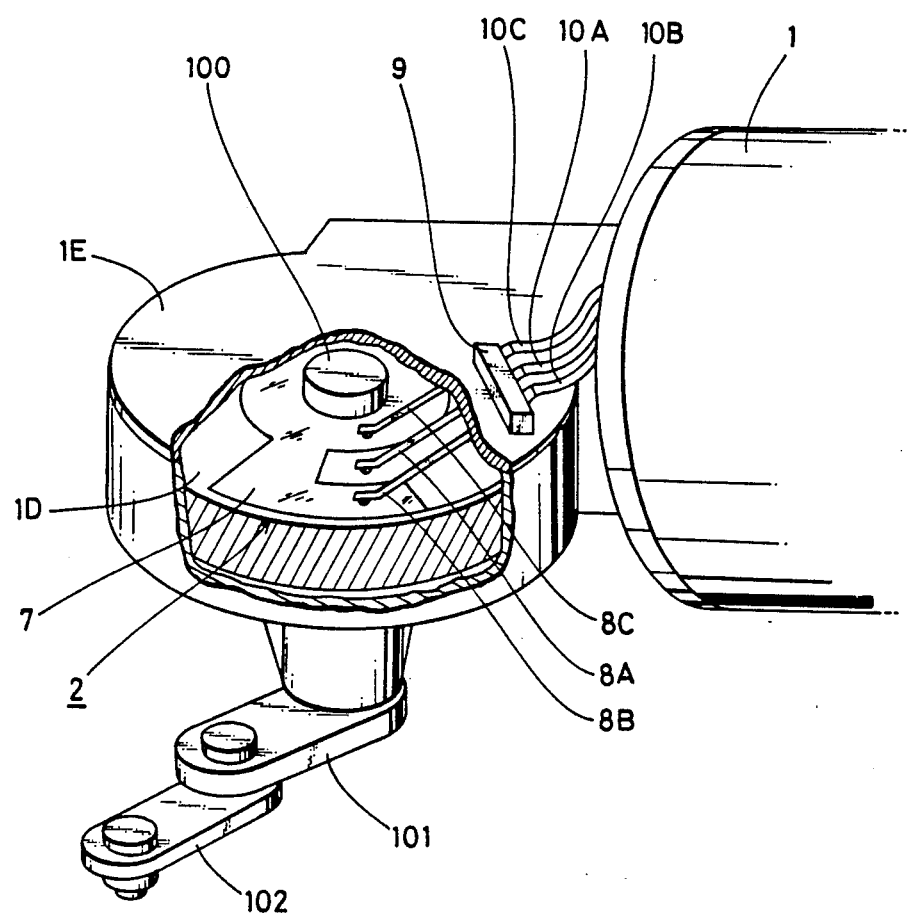
FIG. 1 presents a perspective, partial cutaway view of the wiper motor in the wiper system of the invention.
Figure 1R:
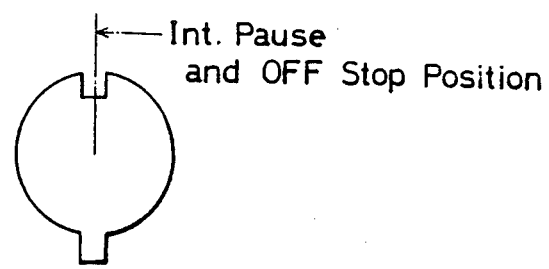

An embodiment of the presently proposed system of the invention is described using the drawings. The wiper motor position detector 2 in this embodiment, as seen from FIGS. 1 and 2, consists of the motor gear 1D made of synthetic resin in the final reduction stage of wiper motor 1, the pattern plate 7 (metal) fastened to the side of said motor gear, and the contact levers 8A, 8B and 8C on the front of said pattern plate 7 the protruding ends of which, under their own spring action, make suitable contact under oscillating contact movement. These contact levers are secured to gear cover 1E by means of contact bush 9, and each of the levers is connected with lead wires 10A, 10B and 10C, respectively.

Pattern plate 7 is formed by the three zones ZA, ZB and ZC consisting of concentric circles with different radii. Two zones (ZA, ZB) form a part of a circle, while the other zone (ZC) is a circle itself. The three zones (ZA, ZB, ZC) form one body so as to interconnect. The contact levers 8A and 8B are arranged so that they have different radial positions in relation to the center of wiper motor 1 output shaft 100, making it feasible for the respective zones ZA, ZB and ZC on the motor gear 1D flank to be contacted with slide. The other contact lever 8C is positioned radially so that contact can be made with the circular zone ZC under slide. Also, contact lever 8C is grounded through the lead wire 10C, and pattern plate 7 is given either a negative or a positive potential. Thus, pattern plate 7 and contact levers 8A and 8B form a switch system to open and close in terms of the rotational position of the output shaft 100 in the wiper motor 1. Thus, the protruding end of contact levers 8A and 8B, respectively, form contact 2A and 2B, respectively, of the wiper position detector. On the front of pattern plate 7 and the motor gear 1D is grease lubrication to reduce friction by contact lever 8A, 8B and 8C.

Figure 2R:
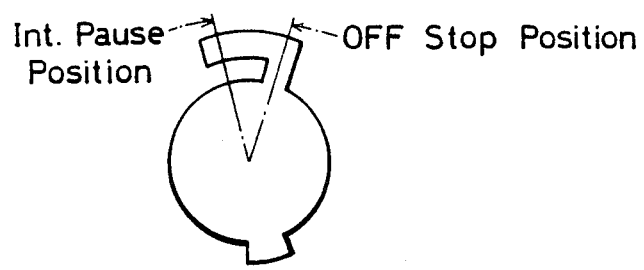
FIG. 2 is a plane view of a wiper motor position detector of the wiper motor.
Figures 2, 3:
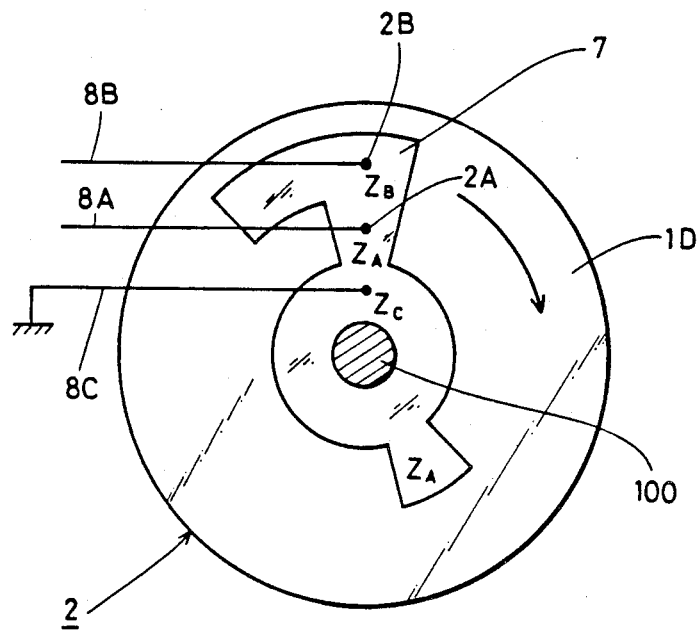
FIG. 3 gives a table of a signal outputs of the position detector.

The condition (see FIG. 2) in which each of the contacts 2A and 2B are in contact with the front of pattern plate 7 corresponds with the wiper motor 1 being at the retracted stop (OFF) position, and with both contact 2A and 2B in the low (L) potential state. Motor gear 1D turns rightward as seen in the figure along with rotation of the motor output shaft 100. When only contact 2A makes contact with the flank of motor gear 1D, this corresponds to the wiper motor 1 intermittent pause position, and contact 2A is in the high (H) potential state. But, when the motor gear 1D turns 180 degrees rightward, only contact 2B comes in contact with the flank of motor gear 1D, in which condition the wiper motor 1 is in the reverse position, with contact 2B in the high (H) potential stage. And when contact 2A and 2B both contacts the flank of the motor gear 1D, the wiper motor 1 is in the median position, with both contacts 2A and 2B in the high (H) potential state. In said median position, the wiper performs its sweeping action. In FIG. 3 is a table indicating signal outputs summarizing operations of the position detector 2.

Using said position detector 2, we herewith describe the retracted stop (OFF) actuation, the intermittent actuation, the LOW actuation and the high actuation well performed by the wiper system in FIGS. 4 through 10.

(Circuit Description)

Figure 4:
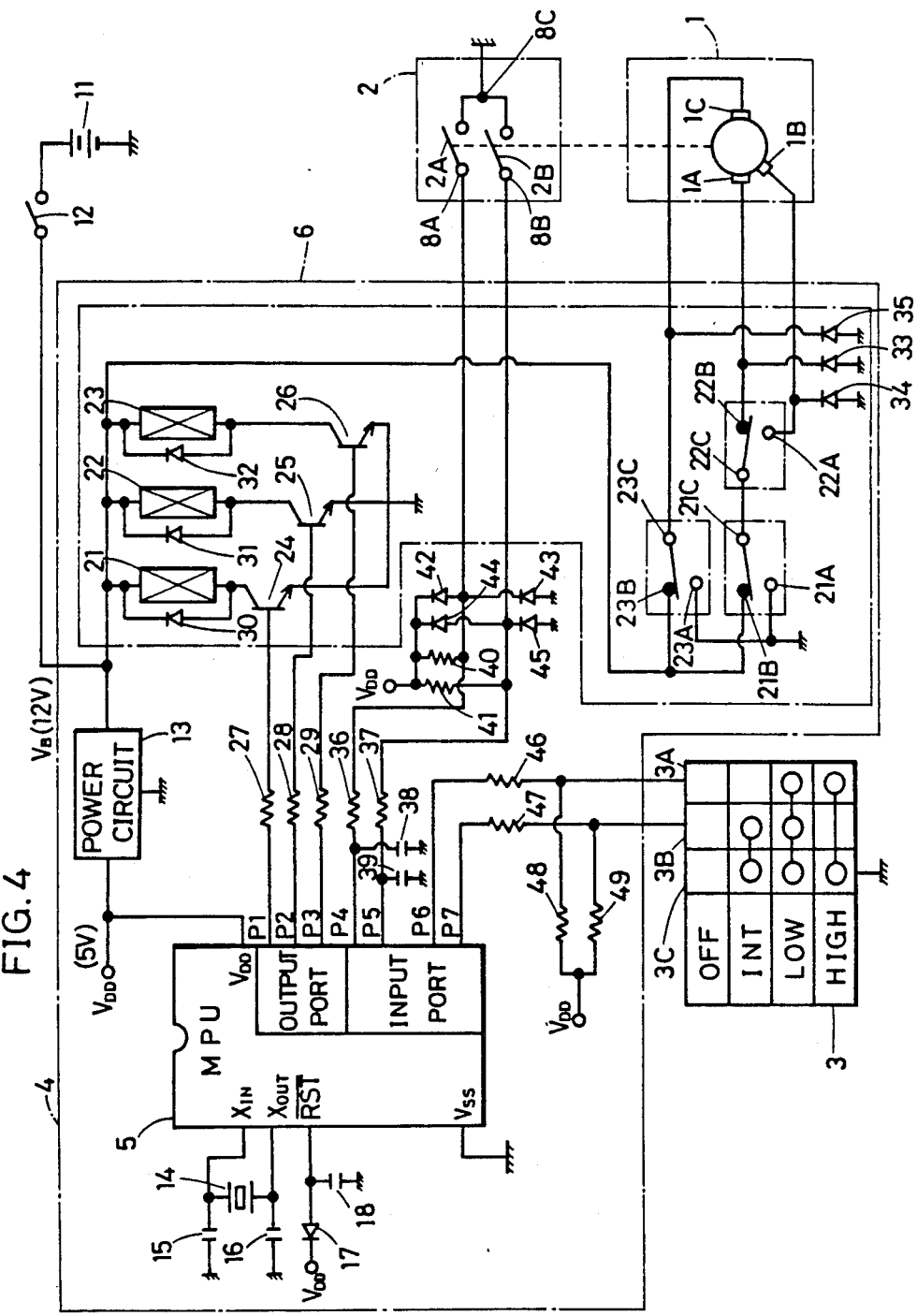
FIG. 4 is a control circuit diagram of the concealed wiper system.

In FIG. 4, the wiper motor 1 which drives the wiper is a motor equipped with a reduction gear, and said motor incorporates a wiper motor position detector 2 for a windshield wiper enabling it to detect the output shaft position. Said wiper motor 1 is a DC type with three brushes (low-speed brush 1A, high-speed brush 1B, and common brush 1C). By brush selection switching one can choose two modes of actuation, either at low or high speed.

Position detector 2 is a switch which opens and closes in accordance with the position of the output shaft 100, of wiper motor 1, and it has contacts 2A and 2B. Said contacts, as described earlier, are arranged to be both closed in the output shaft retracted stop position, open and closed in the intermittent pause position, closed and open in the reverse position, and both open in the median position other than the above three positions. Position detector 2 can output two-bit position signals for the output shaft position.

Wiper actuation switch 3 is a four-way switch settable to retracted stop actuation (OFF), intermittent actuation (INT), low-speed actuation (LOW), and high-speed actuation (HIGH). In terms of the selection as seen in the figure, terminal 3A, 3B and 3C open and close in relation to each other as follows: OFF position (open, open), INT position (open, closed), LOW position (closed, closed), HIGH position (closed, open). The wiper actuation switch 3 can be set to the given position by means of two-bit selected signal outputs.

Control unit 4 has the microcomputer 5 and the wiper motor drive circuit 6.

Microcomputer 5 is a conventional control-type computer incorporating a read-only memory (ROM), and random access memory (RAM), and input/output ports. In accordance with a predetermined program, the microcomputer computes, calculates and compares so as to control the wiper motor drive circuit 6.

In the wiper motor drive circuit 6 within the control unit 4, the vehicle voltage VB (12 V) is supplied by the automotive power source battery 11 via the key switch 12. The voltage in the microcomputer 5 is supplied through the power circuit 13, converting the vehicle voltage VB (12 V) into logic circuit voltage VDD (5 V).

Connected within microcomputer 5 is a clock circuit formed by the crystal oscillator 14 (frequency of several MHz) and the condensers 15 and 16, which serve to stabilize the oscillations. This clock emits the basic clock signals. Then, a reset circuit consisting of diode 17 and condenser 18 is connected, so that when the power is put on with key switch 12 a low level (LOW) reset signal is generated.

Wiper motor drive circuit 6 is provided with forward drive relay 21, high-speed changeover relay 22, and reverse drive relay 23. Relays 21, 22 and 23, respectively, are connected by the coil end to the vehicle power source VB (12 V), with the other end connected to a collector of transistor 24, 25 and 26, respectively. Each transistor 24, 25 and 26 has an emitter connected in and a ground; the base which is respectively hooked up via resistors 27, 28 and 29 to the microcomputer output ports P1, P2 and P3. In each relay coil 21, 22 and 23 absorbance diodes 30, 31 and 32 are connected in parallel.

Normally closed terminals 21B and 23B of forward drive relay 21 and reverse drive relay 23 contacts are both connected up to the vehicle power source VB (12 V), and the normally open terminals 21A and 23A of relays 21 and 23 are both grounded. The common terminal 21C of the forward drive relay 21 is connected to common terminal 22C of the high-speed changeover relay 22 contact; relay 22 normally closed terminal 22B is connected to the low-speed brush 1A of wiper motor 1, which relay 22 normally open terminal 22A is connected to high-speed brush 1B. Common brush 1C is connected to common terminal 23C of relay 23 contact. Since surge voltage generated when the wiper motor 1 is put on and off must escape, diodes 33, 34 and 35 are connected between brush 1A, 1B, 1C and the ground.

Herewith follows a description of the operation of wiper motor drive circuit 6. When microcomputer 5 output ports P1, P2 and P3 are all put at low (L) level (L, L, L), transistors 24, 25 and 26 all go off, none of relays 21, 22 and 23 are energized, and as seen from FIG. 4 low-speed brush 1A and common brush 1C are shorted through normally closed terminals 21B, 22B and 23B of the three relays 21, 22 and 23, making the wiper motor come to a stop. Should this condition occur when the wiper motor 1 is working, armature current flows due to reverse voltage and dynamic braking takes place.

When the output port P1 is put at high level (H) and output ports P2 and P3 are both put at low level (L) (i.e., H, L, L), only transistor 24 is in the ON condition, only relay 21 is energized, and its contacts between terminals 21A and 21C close, grounding low-speed brush 1A and making the wiper motor 1 turn in the forward direction at low speed.

With output ports P1, P2 and P3 at the H, H and L positions, respectively, relays 21 and 22 are energized, terminals 21C and 22C are closed with terminals 21A and 22A, grounding high-speed brush 1B and making wiper motor 1 turn in the forward direction at high speed.

With output ports P1, P2 and P3 at the L, L and H positions, respectively, only relay 23 is energized, terminals 23A and 23C are closed and common brush 1C is grounded. Thus, low-speed brush 1A is connected up to the vehicle power source VB via the normally closed terminals 21B and 22B of relay 21 and 22, so the wiper motor 1 turns in the reverse direction at low speed.

Position detecter 2 has only one end of its two switch contact terminals 2A and 2B grounded; the other end is connected through resistors 36 and 37 as well as condensers 38 and 39 of the chattering absorbance circuit to input port P4 and P5, respectively, of microcomputer 5. In the signal line from contacts 2A and 2B to input ports P4 and P5, to assure that a high-level voltage (H) is maintained in the signal line whenever contacts 2A and 2B are open, pull-up resistors 40 and 41 are connected in, as well as clamping diodes 42, 43, 44 and 45 are connected in to release any noise voltage induced by the wiper motor 1.

Then, with contacts 2A and 2B open and closed (i.e., in accordance with the position of wiper motor 1 output shaft 100), the two-bit position signal is inputted by input port P4 and P5, at the retracted stop (OFF) position (L, L), the intermittent pause position (H, L), the reverse position (L, H), or some other median position (H, H).

As indicated earlier, wiper actuation switch 3 is a switch to start and end actuation, its terminal 3C is grounded, and terminals 3A and 3B are connected to input port P6 and P7 of microcomputer 5 via resistors 46 and 47, respectively, as well as being hooked up to pull-up resistors 48 and 49. In terms of the wiper actuation switch setting, two-bit selected signals are inputted by input ports P6 and P7 and the retracted stop (OFF) position (H, H), the intermittent (INT) position (H, L), the low-speed (LOW) position (L, L), and the high-speed (HIGH) position (L, H).

(Description of Mechanism)

Figure 5:
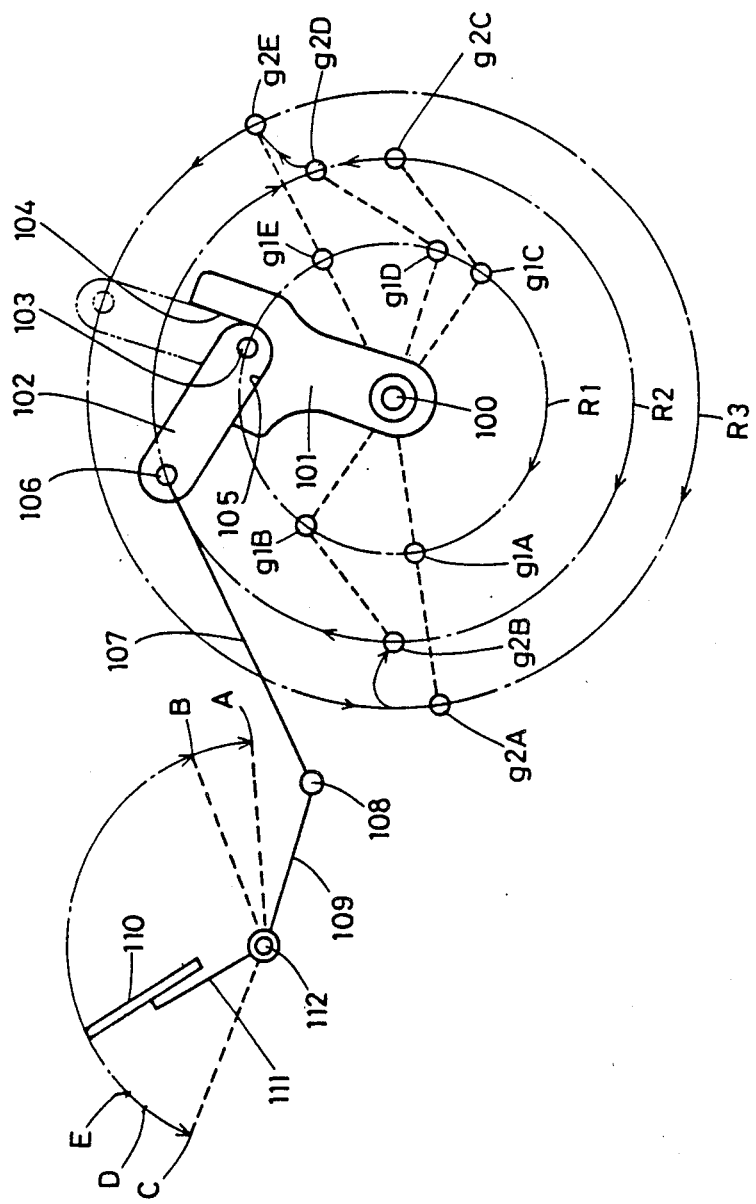
FIG. 5 offers a schematic of the wiper system mechanism.

FIG. 5 is a schematic drawing of the mechanism of the wiper system.

The first crank arm 101 is fastened to the output shaft 100 of the reduction gear-equipped wiper motor 1 so as to be unitized and thus revolve with it. The second crank arm 102 on the first crank arm 101 is so supported that it can turn with shaft 103 as its center. Second crank arm 102 has a turn area defined by retainer edges 104 and 105 on the first crank arm 101. Second crank arm 102 extends straight out is relation to first crank arm 101 so as to contact the retainer edge 104 in the extended condition, from which is flexed nearly 90 degrees to contact retainer edge 105 in the flexed condition.

Second crank arm 102 has a link rod 107 passing through the coupling shaft 106 on its end portion, and this link rod 107 is connected with coupling rod 109 through coupling shaft 108. Coupling rod 109 is secured to wiper arm 111, which is equipped with wiper blade 110 and so supported on oscillation shaft 112 as to oscillate freely.

When the first crank arm 101 is within the predetermined angle range in relation to the wiper motor, the second crank arm 102 is free to turn in relation to the first crank arm 101. In any other case, a lock mechanism (not illustrated) using a cam cuts in and locks the system into either the extended or flexed condition.

The operation of the wiper system mechanism is as follows.

In the retracted stop condition, wiper blade 110 is retracted and housed at retracted stop position A outside of the normal sweep range (between B and C). At this time first crank arm 101 is at the retracted stop position g1A, second crank arm 102 is in the fully extended position, and coupling shaft 106 is at retracted stop position g2A. The lock of the above-mentioned lock mechanism is in the released condition at this time. Hereinafter, the position of second crank arm 102 indicates the position of coupling shaft 106.

The wiper motor output shaft 100 is made to turn with forward rotation (clockwise on the figure schematic). When the first crank arm 101 is moved forward circumferentially from R1 retracted stop position g1A to intermittent pause position g1B, the second crank arm 102 rotates leftward with shaft 103 as its center under the reactionary rotational force drawing it from link rod 107, in the flexed condition. During this time second crank arm 102 moves from the retracted stop position g2A to intermittent pause position g2B, as a result of which wiper blade 110 ascends from retracted stop position A to intermittent pause position B.

Next, when the first crank arm 101 is rotated in the forward (clockwise) direction, the second crank arm 102 is rotated in the fully flexed condition, with coupling shaft 106 turning clockwise circumferentially around R2. As the clockwise motion continues, wiper blade 110 makes its sweep back and forth between intermittent pause position B and reverse position C. When said wiper blade reaches reverse position C, the first crank arm 101 position is 180 degrees from the intermittent pause position g1B at reverse position g1C, while second crank arm 102 is at position g2C.

In this way, by forward movement of wiper motor output shaft 100 with first crank arm 101 moving forward (clockwise), the normal sweeping action (high speed, low speed, intermittent) is performed.

To house the wiper blade 110, which is in the usual sweeping area (between position B and C), at the retracted stop position, the first crank arm 101 is reverse rotated (counterclockwise) from near the reverse position g1C to the retracted stop position g1A.

When the crank arm 101 reaches the reverse position g1C, the lock mechanism is released. Thus, when the reverse rotation begins, second crank arm 102 is made to rotate rightward with shaft 103 as its center under reactionary rotational force exerted by link rod 107.

This changes the condition from flexed to extended, and the position shifts circumferentially from R2/g2C to R3/g2E. At such time the first crank arm 101 shifts from reverse position g1C up as far as position g1E, and wiper blade 110 moves slightly from reverse position C to position E.

While first crank arm 101 moves back (counterclockwise) from position g1E to intermittent pause position g1B and then to the retracted stop position g1A where it halts; second crank arm 102 is locked in the extended condition, moves counterclockwise circumferentially around R3, coming to a stop at the retracted stop position g2A. However, at this time the lock has been released. During this phase the wiper blade 110 is driven by a long, extended crank, passing from position E beyond the intermittent pause position B, coming to rest at the retracted stop position A.

(Description of Operation)

Figure 6:
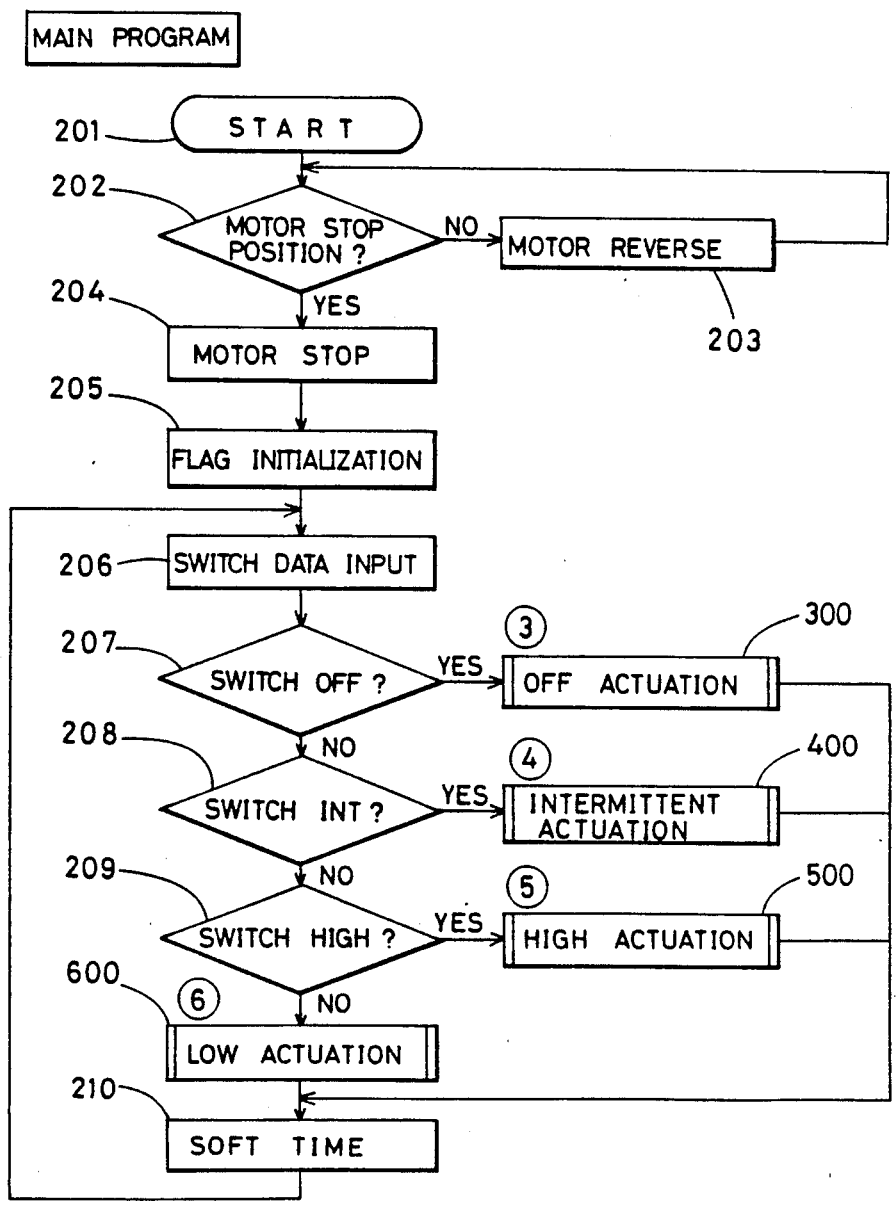
FIG. 6 is a flow chart illustrating main program in the microcomputer.

Based upon the above-described arrangement, the actual microcomputer 5 processing involved in realizing the operation in fact is described as follows using flow charts. FIG. 6 gives a flow chart presentation of the main program.

When the power is put on and the initial phase is accordingly completed, the main program is begun. First, in step 202, a check is run to determine whether the wiper motor 1 output shaft 100 is at the retracted stop position g1A. If it is not at said position, advance is made to step 203, in which the output ports P1, P2 and P3 (at L, L, H) energize the reverse drive relay 23 and the wiper motor 1 is reversed at low speed. Then there is a return to step 202, in which the wiper motor 1 output shaft 100 reverses motion until it reaches the retracted stop position g1A. Once it reaches said position, the step is advanced from 202 to 204, in which the output ports P1, P2 and P3 (at L, L and L) stop the wiper motor 1.

Thus, in the step 202 to 204 processing, should the wiper not be housed at the retracted stop position when the power is put on, the wiper motor 1 is reverse driven to bring the blade back to the retracted stop position. When the key switch 12 was used in the previous wiper operation to cut off the power and bring the system to a stop, the condition of crank arm 101 or 102 was not known, so an interlock means was used to prevent incompatible operation after the wiper had been shifted to the retracted stop position, irrespective of the actuation switch position. For example, during the previous wiper operation when in the retracted stop position, should the first crank arm 101 reverse its movement from reverse position g1C to position g1E, the power will be cut off immediately after second crank arm 102 is extended. In this condition, should actuation switch 3 be set to the intermittent, low-speed or high-speed positions, when the power is put on the next time and the wiper motor is run forward for the sweeping action, the effective crank length would be longer than in the flexed condition, making the wiper blade 110 sweep beyond the ordinary sweep range B-C and thus damage the wiper system. This is why the interlock means is used.

When the above-described interlock action has been completed, the advance is made to step 205 for the initial setting of each flag.

Next, in step 206, to check the selection position of wiper actuation switch 3, the data of input port P6 and P7 are read in. Then, in steps 207, 208 and 209, the read-in wiper actuation switch data are checked; if the wiper actuation switch 3 selected position is the retracted stop (OFF) position data (H, H), one proceeds from step 207 to the retracted stop (OFF) actuation sub-routine 300; if it is the intermittent (INT) actuation position data (H, L), one proceeds from step 208 to the intermittent actuation sub-routine 400; and if it is the high-speed (HIGH) position data (L, H), one moves from step 209 to the high-speed actuation sub-routine 500. Should the selected position data be none of the above three, it must be the low-speed actuation position, so one may proceed from step 209 to the low-speed actuation sub-routine 600.

When the above-cited actuation sub-routine 300 to 600 have been completed, we return to the main program and proceed with step 210. In said step, only 0.1 second is taken before completion and moving on back to step 206. Thereafter steps 206 to 210 are repeated, with care for monitoring that the wiper actuation switch 3 selected position is done for the fixed time determined in step 210. Processing is done in terms of the selected position.

Figure 7:
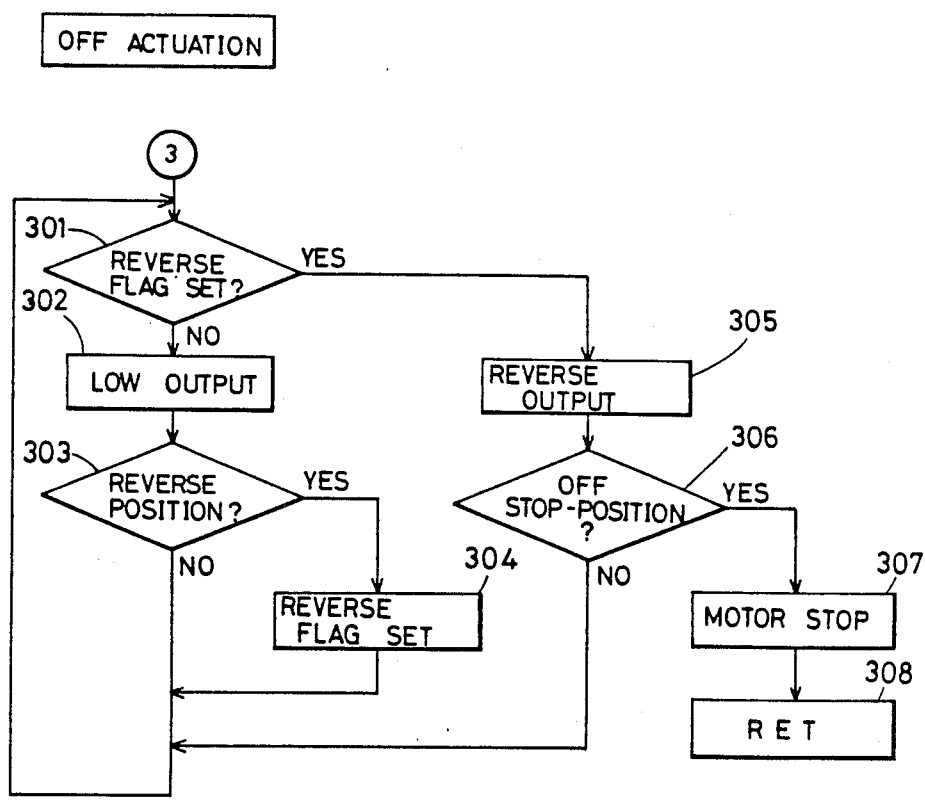
FIG. 7 is a flow chart illustrating an off actuation sub-routine.

FIG. 7 is a flow chart detailing the retracted stop (OFF) actuation sub-routine 300.

When the wiper actuation switch 3 is switched to the retracted stop (OFF) position, the advance is made from main program step 207 to step 301 of the retracted stop position actuation sub-routine 300. In step 301, a check is made to determine whether the reverse flag has been set which indicates that first crank arm 101 has attained the reverse position g1C. At first the reverse flag was reset, so the move is made to step 302. In said step, with output of the output ports P1, P2 and P3 (H, L, L), the forward drive relay 21 is energized and the wiper motor 1 made to move in the forward direction. Next, in step 303, a check is made to determine if input ports P4 and P5 are at L and H, respectively, and if wiper motor 1 output shaft 100 has attained the reverse position g1C. If output port P4 and P5 are at L and H, respectively, at the reverse position, the move is made to step 304, in which the reverse flag is set; if not in said position, nothing is done but the move is made to step 301.

Thus, by repeated performance of step 301 to 303, the wiper motor 1 is driven at low speed in the forward direction. When the output shaft 100 (i.e., crank arm 101) has reached reverse position g1C, in step 304 the reverse flag is set and the return is made to step 301. This reverse flag serves to confirm that, at the time of retracting actuation, the first crank arm 101 is moving forward to attain reverse position g1C. It is reset when the low-speed or other actuation is selected, and it is set at the initial flag setting step 205.

In this instance, the reverse flag has been set, so we proceed from step 301 to step 305. In the latter step, output ports P1, P2 and P3 are outputted (L, L, H) and the reverse drive relay 23 is energized, making the wiper motor 1 move at low speed in the reverse direction. Next, in step 306, a check is made to determine whether input port P4 and P5 are at L and L, respectively, and whether the wiper motor 1 output shaft 100 has arrived at the retracted stop position g1A. If said shaft has not thus arrived, step 301, 305 and 306 are repeated, reversing the wiper motor until the retracted stop position g1A is attained and one can proceed from step 306 to step 307. Then, in step 307, with the output ports P1, P2 and P3 at L, L and L, respectively, the wiper motor 1 is stopped. In step 308 we return to the main program step 210.

Thus, in the retracted stop (OFF) actuation sub-routine 300, the first crank arm 101 is moved ahead to the reverse position g1C, but then the procedure is arranged to return it to retracted stop position g1A. This processing is such that, no matter at what position the first crank arm 101 might be when the wiper actuation switch 3 is switched to the retracted stop (OFF) position, the second crank arm 102 will attain the extended condition and the wiper blade 110 will surely be able to be housed at the retracted stop position A.

Also, following the initiation of the retracted stop (OFF) actuation, there is no return to the main program until the process is completed; even should the wiper actuation switch 3 be worked during the retracted stop actuation, there is no advance to the next step until the retraction and stop are completed. The system is devised to prevent the second crank arm 102 from moving into the next phase of actuation in the extended condition, shifting forward and causing problems.

Figure 8:
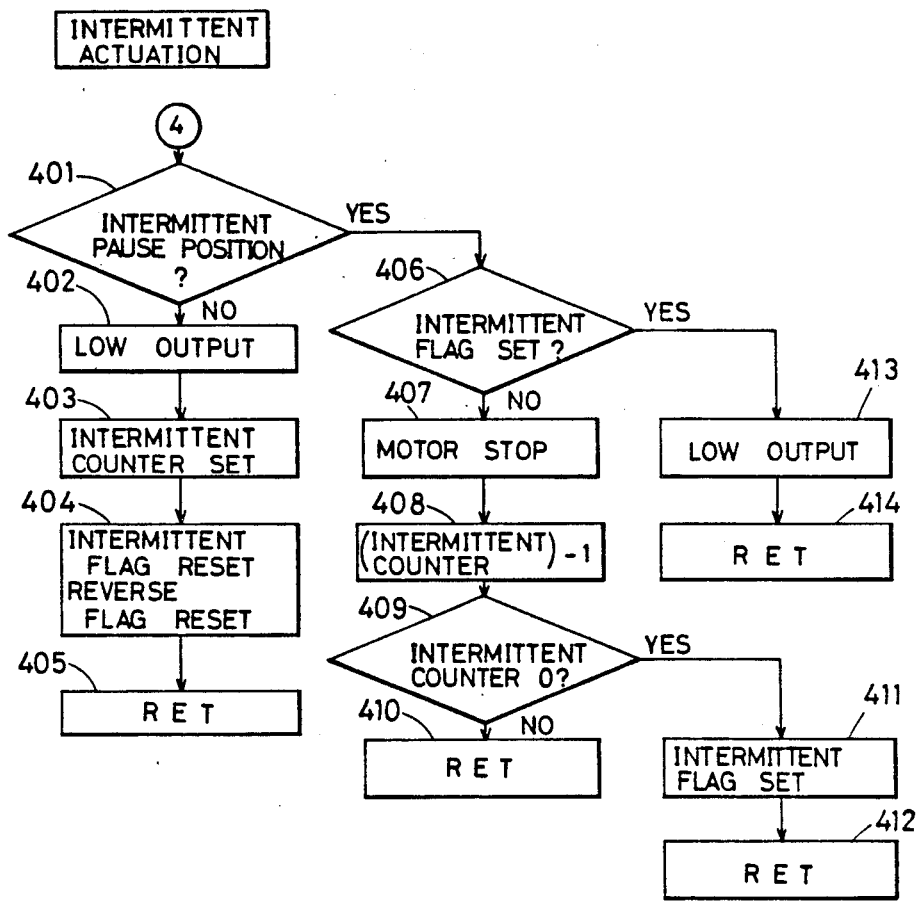
FIG. 8 is a flow chart illustrating an intermittent actuation sub-routine.

FIG. 8 is a flow chart detailing the intermittent (INT) actuation sub-routine 400.

When the wiper actuation switch 3 is used to select the intermittent (INT) actuation position, the procedure moves from the main program step 208 to the intermittent actuation (INT) sub-routine 400 step 401.

In step 401, a check is made as to whether input ports P4 and P5 are at H and L, respectively, and whether the output shaft 100 of the wiper motor 1 is at intermittent pause position g1B. If it is not at the latter position, the move is made to step 402, in which, with the output ports P1, P2 and P3 at H, L and L, respectively, the wiper motor 1 is run at low speed; then, in step 403, a fixed value is set for the intermittent counter, making preparations to measure the intermittent pause time. Next, in step 404, the intermittent flag and reverse flag are reset, and the move is made from step 405 back to step 210 of the main program. Then, step 401 and 405 are performed until the wiper motor 1 output shaft 100 comes to the intermittent pause position g1B, making wiper motor 1 rotated at low speed.

When the output shaft 100 reaches the intermittent pause position g1B, the procedure moves from step 401 to step 406. In step 406, a check is made as to whether the intermittent flag has been set. At the outset in step 404, it was reset, so the procedure can advance to step 407. In the latter step, output ports P1, P2 and P3 are outputted (L, L, L), the wiper motor 1 is stopped, and in step 408 the sum of one is subtracted from the intermittent counter value. Next, in step 409, a check is made to see if the intermittent counter value is zero; if not, the move is made from step 410 to step 210 in the main program. Then, the following steps are repeated in order until the intermittent counter value attains zero; steps 210, 206, 207, 208 and steps 401, 406, 407, 408, 409 and 410. Each time the main program step 210 is passed, a fixed time of, say, 0.1 second is taken so that the intermittent counter value set in step 403 to be 20, the output shaft 100 would momentarily stop for approximately 2 seconds at intermittent pause position g1B.

When the intermittent counter reaches zero, we move from step 409 to step 411. The intermittent flag is set and then we move from step 412 back to step 210 of the main program.

In the next intermittent actuation sub-routine, since the intermittent flag has been set we can move from step 406 to step 413. In the latter step, output ports P1, P2 and P3 are outputted (H, L, L), and the wiper motor 1 is put into low-speed actuation once more. Then we move from step 414 back to step 210 in the main program.

In the following intermittent actuation sub-routine, the procedure goes from step 401 to beyond step 402. Again, the low-speed motion is continued until the output shaft 100 reaches the intermittent pause position g1B, the above-mentioned processing is repeated, and the intermittent actuation is accomplished.

Figure 9:
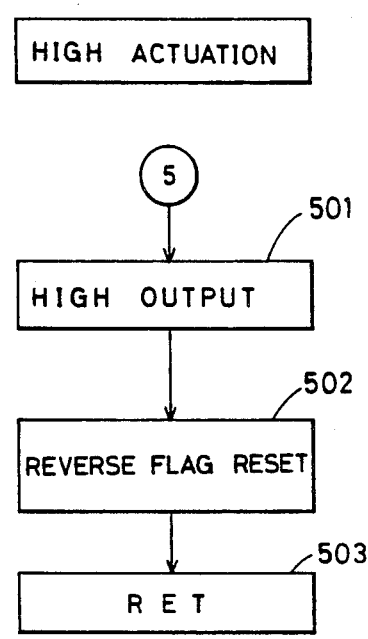
FIG. 9 shows a flow chart of the high speed actuation sub-routine.
Figure 10:
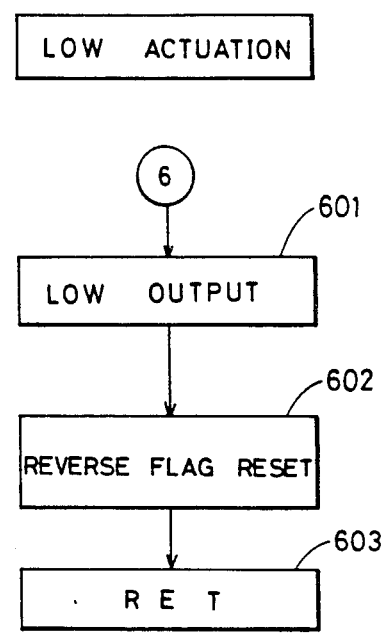
FIG. 10 shows a flow chart of the low speed actuation sub-routine.

FIG. 9 is a flow chart detailing the high-speed (HIGH) actuation sub-routine 500, and FIG. 10 is a flow chart of the low-speed (LOW) actuation sub-routine 600.

When the high-speed (HIGH) operation actuation is selected by means of the wiper actuation switch 3, the procedure goes from step 209 of the main program to the step 501 of the high-speed (HIGH) actuation sub-routine 500. In step 501, with output ports P1, P2 and P3 at H, H and L, respectively, the forward drive relay 21 and high-speed changeover relay 22 are energized; the wiper motor 1 is made to turn at high speed in the forward direction, and in the next step 502 the reverse flag is set before moving from step 503 back to step 210 of the main program. Then steps 501 through 503 are repeated, and the wiper motor 1 is actuated at high speed.

When the low-speed (LOW) actuation position is selected by means of the wiper actuation switch 3 the procedure moves from step 209 of the main program to the step 601 of the low-speed (LOW) actuation sub-routine 600. In step 601, with output ports P1, P2 and P3 at H, H and L, respectively, only the forward drive relay 21 is magnetized, and the wiper motor 1 is actuated at low speed in the forward direction; then, in step 602, the reverse flag is reset and the procedure moves back to step 210 of the main program from step 603. Thereafter, step 601 to 603 are repeated, and the wiper motor 1 is run at low speed.

In this manner, in accordance with the selected position of wiper actuation switch 3, the respective actuation can be performed.

(Advantages of Actually Used Embodiment)

In the embodiment exemplified and described in the foregoing, the use of microcomputer 5 for the control proves advantageous, because complex control actuations are readily possible with simple circuit construction; for example, the actuation bringing the blade back to the retracted stop position by reversing from the specified reverse position g1C; or the interlock function making the wiper motor 1 reverse when the power is put on. It is for this reason that a wiper system with a simple mechanism can be controlled by a control device with simple circuitry.

Also, in the momentary rest interval during intermittent actuation, the set value of the intermittent counter is established in step 403, so the pause time can be easily changed. And just by working the selection switch inside the vehicle the pause time can be set, or even easily adjusted in terms of the vehicular speed.

In the above-described embodiment, a wiper motor position detector 2 was used for the explanation which incorporated a contact-type position feedback switch. Actually, a photosensor or magnetic sensor type with no contacts could also be used.

In the embodiment exemplified and described in the foregoing, the wiper motor position detector has the advantage of impressing the above-described pattern plate with a definite low electric potential by grounding said moving pattern plate by slide of the contact levers on the surface thereof. Another advantage of the device is the great simplicity of its construction which allows switching (open, closed) in reliable fashion of a minimal electric current, an improvement over the special compression spring approach in which the contacts are forced into contact with the pattern plates. In the present system, the contact levers acting as sliders are attached to one end of the wiper motor gear cover. Their protruding ends make suitable contact with the pattern plates and with their spring action they slide and maintain contact with the pattern plates on their own. Still another advantage is the extremely easy manufacture of the present device, because the aforesaid pattern plates form three zones which are concentric circles with different radii, the one zone being a circle and the others forming a part of a circle but all three zones being interconnected so as to make a single unit for a highly regular configuration.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A concealed wiper system comprising:
   a wiper motor having an output shaft selectively drivable in one of a normal and reverse direction,
   a wiper arm movable to a retracted stop position,
   a first crank arm and a second crank arm connected between said output shaft and said wiper arm, said second crank arm being connected to said first crank arm and movable relative to said first crank arm to an extended position when said wiper motor output shaft is driven in said reverse direction such that said wiper arm is moved to said retracted stop position,
   a wiper activation switch movable between a plurality of switch positions and a two bit selection signal output responsive to said switch positions,
   a wiper motor position detector including a plurality of detector contacts connectable to ground at prescribed rotary positions of said output shaft and a two bit detection signal output responsive to the constructions between said contacts and ground,
   a wiper motor drive circuit connected with said wiper motor to activate said drive motor to drive said output shaft selectively in one of said normal and reverse directions,
   control means to provide control signals to said wiper motor drive circuit, said control means including a microcomputer responsive to said selection signal output and said detection signal output to provide said control signals to said wiper motor drive circuit.

2. The concealed wiper system according to claim 1, wherein said wiper motor includes an electrically insulated motor gear having a side surface and being positioned in a final reduction stage of said wiper motor, a grounded pattern plate being provided on said side surface and including conductive plates of a desired configuration, said wiper motor position detector having two contact levers connectable to said grounded pattern plate such that the combination of connections between said two contact levers and said conductive plates enables detection of up to four actuating positions of said wiper motor by said two bit detection signal output.

3. The concealed wiper system according to claim 2, wherein said wiper motor further includes a gear cover to which said contact levers are attached, said contact levers having protruding ends making pressure contact with said conductive plates through a spring action of said protruding ends.

4. The concealed wiper system according to claim 2 wherein said wiper motor position detector includes a third contact lever which is connected to one of said conductive plates so as to be always capable of contact with said plate.

5. The concealed wiper system according to claim 4, wherein said wiper motor further includes a gear cover to which said contact levers are attached, said contact levers having protruding ends making pressure contact with said conductive plates through a spring action of said protruding ends.

6. The concealed wiper system according to claim 4, wherein one of said conductive plates forms an inner circular zone, a second of said conductive plates forms an intermediate radial zone and a third of said conductive plates forms an outer radial zone, all of said zones being interconnected, said third contact lever being in constant contact with said inner circular zone and said two contact levers being interconnectable with said intermediate radial zone and said outer radial zone.

* * * * *